Patented Apr. 4, 1944

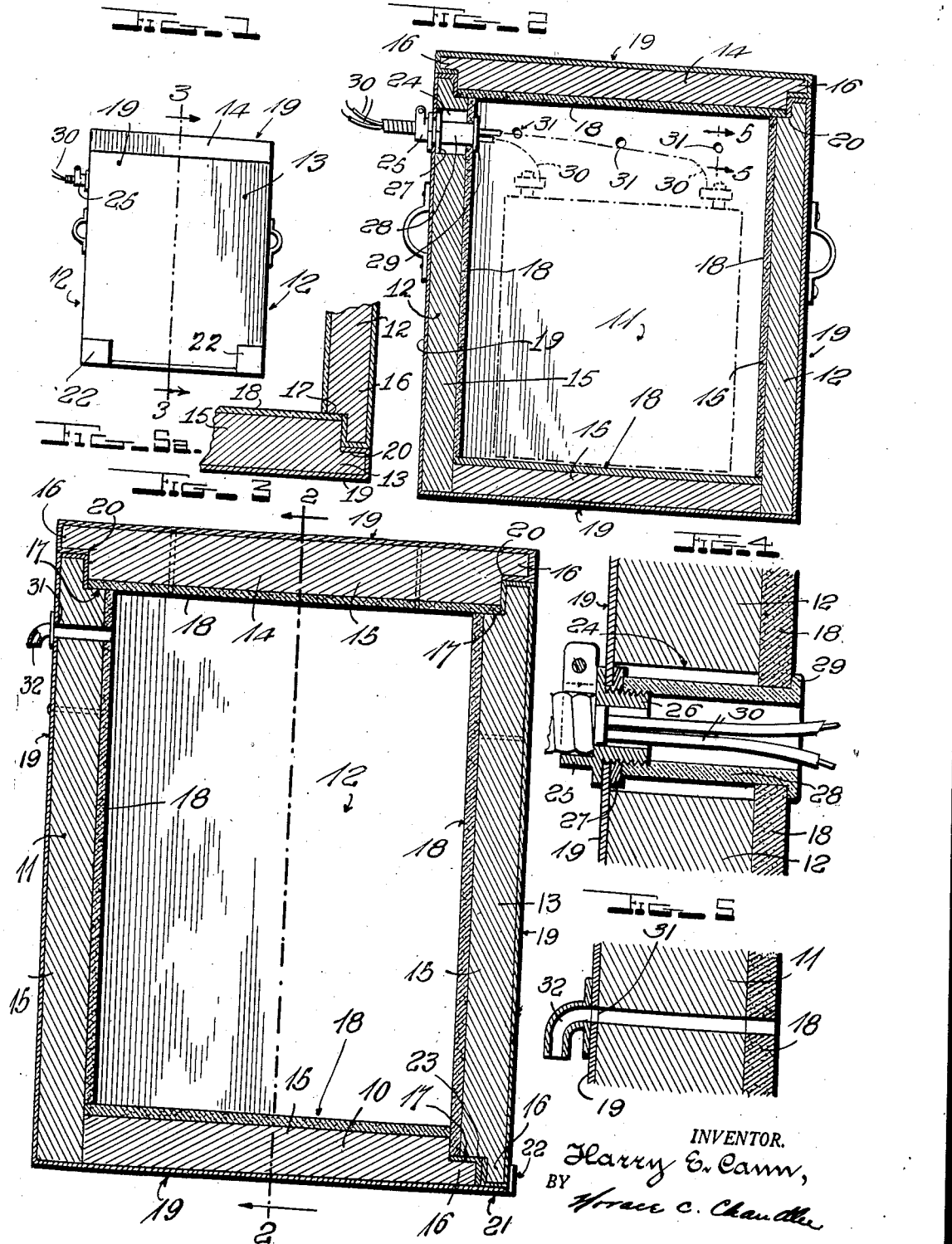

2,345,792

UNITED STATES PATENT OFFICE 2,345,792

CABINET FOR HOUSING AUXILIARY ELECTRICAL EQUIPMENT

Harry E. Cann, West Chester, Pa.

Application March 7, 1941, Serial No. 382,259

2 Claims. (Cl. 312—100)

This invention relates to cabinets, and more particularly to cabinets for housing the auxiliary electrical equipment used by railways for energizing electrically-operated devices such as signals, switches, et cetera.

In order that the nature of the invention may be clearly understood, it is pointed out that in cases where the current for energizing electrically-operated devices of the character mentioned is derived from line wires, it is common practice to use auxiliary sources of current supply which are placed in operation in the event that the supply of current from the line wires becomes interrupted due to damage to said wires or from any other cause. The auxiliary equipment comprises a number of units, each of which is housed in an unheated shelter located at a convenient point along the railway. Each unit includes storage batteries provided with a trickle charger which functions so long as the line wires are in operating condition to keep the batteries charged. When service from the line wires becomes interrupted, however, and the auxiliary apparatus is placed in operation, the charger ceases to function, so that the batteries gradually become discharged while in operation. Should they become discharged to a sufficient degree, they are subject to damage by freezing in winter weather. Because of the length of the period for which it is sometimes necessary for this auxiliary equipment to be in use, it has been found advisable to employ storage batteries of a large size so as to lessen the possibility of their being discharged to a point where freezing will occur. The cabinet comprising the present invention is intended for use as a container for the storage batteries, the trickle charger, and such other elements of a unit of the auxiliary equipment as may be desired, and this cabinet is housed within the unheated shelter to which reference has been made.

An object of the invention is to provide a cabinet for the purpose mentioned, which shall be so constructed as to protect its contents against freezing.

A further object is to provide a cabinet for use as stated, having a lining that is resistant to the acid associated with storage batteries and fumes arising therefrom, which lining will also be a non-conductor of electricity.

A further object is to provide a cabinet for the purpose mentioned, wherein access to the interior may be gained either from the top, from the front, or from both.

A still further object is to provide a cabinet for housing equipment including a storage battery provided with a trickle charger, which cabinet shall have a covering of sheet metal so arranged as to eliminate direct transfer from the interior to the exterior of the cabinet of heat caused by the operation of the trickle charger.

Additional objects and advantages will be apparent from the following description when taken in connection with the accompanying drawing, in which Fig. 1 is a front end elevation of a cabinet according to the present invention, Fig. 2 is a vertical sectional view on the line 2—2 of Fig. 3, Fig. 3 is a vertical transverse sectional view on the line 3—3 of Fig. 1, Fig. 4 is an enlarged detail view showing means for conveying electrical wires to the inside of the cabinet, Fig. 5 is a detail view illustrating a breather opening connecting the interior of the cabinet with the outer air, taken on line 5—5 of Fig. 2, Fig. 5a is a detail sectional view of the joint between an end wall and the front wall.

Referring to the drawing, the cabinet is substantially rectangular in shape and includes a bottom wall 10, a rear wall 11, end walls 12, a front wall 13, and top wall 14, each of which includes an insulating panel 15, formed of cork board, or other suitable heat-insulating material. The insulating panels of the end and rear walls are tightly secured at their lower margins to the end and rear edges, respectively, of the insulating panel of the bottom wall 10, by cementing or otherwise, and the rear edges of the end walls 12 are likewise secured to the end margins of the rear insulating panel. The front wall 13 and the top wall 14 are formed as interfitting loose sections, however, so that they may be independently removed in order that access to the cabinet may be gained from both the top and the front, or from either. As shown in the drawing, the free edge faces of the bottom wall 10, the rear wall 11, and the end walls 12 are rabbeted, resulting in flanges 16 and shoulders 17, the same being true of the four edge faces of the front and top walls 13 and 14. Tightly connected to the inner faces of the insulating panels 15 of each wall of the cabinet, but so as not to overlie the shoulders 17, is a covering or lining 18 of rock board or other material resistant to the acid associated with storage batteries and fumes arising therefrom. The lining 18 may be secured to the insulating panels by means of bolts passing through both, or in any other suitable manner.

In order to protect the entire exterior of the cabinet from damage, the outer faces of the connected bottom, rear, and end walls are provided with a covering of sheet metal 19, preferably galvanized iron, as are also the outer faces of the top and front walls. The metal 19 is tightly fitted against the outer faces of the insulating panels 15, to which it is secured in any desired manner, and with the exception of the front edge face of the bottom wall 10 is folded to fit snugly over the flanges 16 with its free edge resting on the shoulder 17, as shown at 20. At the front edge of the bottom wall 10, the sheet metal extends forwardly as at 21 for a distance approximately equal to the thickness of the lower metal-covered flange 16 of the front wall so as to provide a support therefor, and extending vertically upward from the front edge of the extension 21 are spaced lugs 22, which overlie the front wall when the same is in position. Welded or otherwise secured to the upper face of said extension is an edge portion of a strip 23 of sheet metal corresponding to the metal 19, which strip is folded over the flange 16 at the free edge of the bottom wall 10, as shown. It will be noted that the sheet metal covering does not extend to the interior of the cabinet at any point. This arrangement is provided in order to prevent the metal from transferring heat from the interior to the exterior of the cabinet.

For the admission of electrical wires to the interior of the cabinet, an opening 24 is formed through an end or rear wall thereof in the outer end of which opening is mounted a conventional type of fastener for securing an end of the metal covering of armored wires, which fastener includes a socket portion 25 having a reduced exteriorly threaded nipple 26 extending into the opening 24 beyond the sheet metal 19. Positioned on the nipple 26 is a jam nut 27 which bears against the sheet metal covering, thus securing the fastener in place. Also threaded onto the nipple 26 is the inner end of an insulating tube 28 having an annular flange 29 at its other end which bears against the acid-resisting lining 18. The electrical wires 30 extend through the tube 28 into the cabinet for attachment to the electrical apparatus housed therein.

Also formed in any of the fixed walls of the cabinet, near the upper edge thereof, is a hole 31, and secured to the sheathing 19, in line with said hole, is a down-turned L 32. Any desired number of these holes with L's may be provided. The holes are to prevent building up of pressure within the cabinet and the L's 32 are to prevent the entrance of rain, dirt, et cetera to the interior of the cabinet.

The operation of the device is as follows: After the electrical mechanism has been assembled within the cabinet and the wires 30 connected thereto, the top wall 14 is slid, from the front, into the position shown in Fig. 3 with rear and end marginal portions of its lining 18 resting upon the shoulders 17 of the rear and end walls. The front wall 13 is then placed with its lower flange 16 resting on the extension 21 behind the lugs 22 after which it is swung into position, as shown in Fig. 3, where it may be securely held against the end, top, and bottom walls by suitable clamping fasteners, not shown. Provision is made for sliding the cover into position in the manner described because of the limited space within the shelters usually provided for housing the auxiliary apparatus.

From the foregoing description, it will be seen that the present invention provides a cabinet which will effectively house and protect against low temperatures and inclement weather the electrical apparatus in connection with which it is intended for use. It will be understood that an electrical heating device controlled by a thermostat may be arranged within the cabinet if so desired.

Having thus described my invention, I claim:

1. A cabinet having end, rear, top, bottom, and front walls, the end, rear, and bottom walls being fixedly connected together, and the top and front walls being removably associated with the fixed walls, said walls having rabbeted edge faces resulting in flanges and shoulders, the top wall being supported on the shoulders of the front, rear, and end walls, the front wall having its flanges in engagement with the flanges of the end, bottom, and top walls, each of said walls having a covering of sheet metal marginal portions of which are bent into surrounding relation with the flanges of the rear, front, end, and top walls, the metal covering of the bottom wall being extended beyond its free edge to form a support for the front wall, a metal strip overlying the flange of the bottom wall and being secured to said support, and lugs projecting upwardly from the forward edge of the support for engagement with the outer face of the front wall.

2. A cabinet having fixed end, rear and bottom walls and removable top and front walls, the free marginal edges of said walls being rabbeted for interfitting engagement, a covering of sheet metal for the outer faces of said walls, the metal covering of the bottom wall being extended beyond its free edge to form a ledge to support the lower edge of the front wall, and lugs projecting upwardly from the forward edge of the ledge adapted to engage the outer face of the front wall to retain the front wall in interfitting engagement with the adjacent walls.

HARRY E. CANN.